Patented Dec. 15, 1953

2,662,895

UNITED STATES PATENT OFFICE 2,662,895

REVERSIBLE SOLVENT-SOLUBLE DERIVATIVES OF PHTHALOCYANINE PIGMENTS

Charles John Pedersen, Salem, N. J., assignor to E. I. du Pont de Nemours and Company, Wilmington, Del., a corporation of Delaware No Drawing. Application October 19, 1951, Serial No. 252,187

9 Claims. (Cl. 260—314.5)

1

This invention relates to novel, solvent-soluble leuco derivatives of metal-free and metal-phthalocyanines. It is an object of this invention to produce novel compounds of the above general class which are characterized by economy of production, stability in storage, and general adaptability for industrial use, as for instance in the dyeing or printing of textile fibers. Various other objects and achievements of this invention will appear as the description proceeds.

It is well known that the phthalocyanines are sensitive to oxidizing agents, which generally disrupt the macrocyclic structure, producing phthalimide or related degradation products (Linstead et al. J. C. S. 1934, pages 1033–1038). It has also been known that under special conditions certain colors of the phthalocyanine series may be oxidized to an intermediate, reversible stage. Thus, A. H. Cook (J. C. S., 1938, pages 1763–1778) described certain brown-colored, intermediate oxidation products of iron phthalocyanine when the latter was brought into contact with hydrogen peroxide or the alpha-peroxide of tetralin. Linstead et al. (J. C. S. 1950, 2981) observed the formation of purple or brown intermediate oxidation products when metal-free phthalocyanine was treated with ceric sulfate in aqueous suspension.

The intermediate, reversible oxidation-products thus obtained have different solubility characteristics than the generally insoluble parent materials. They have none of the pigment properties of the initial material, having exchanged the characteristic intense reddish-blue to greenish-blue color of the phthalocyanine pigment for an unstable violet color in some cases, or a reddish brown color in others. But unlike the end products of degradative oxidation, the intermediate oxidation stages have the remarkable property of regenerating the original color upon being treated with reducing agents or upon heating.

Linstead et al. suggested a structure for the intermediate oxidation product, which may be expressed by the equation:

$$PcH_2 + O + H_2O \rightarrow PcH_2(OH)_2$$

$PcH_2$ in this formula stands for dihydrogen phthalocyanine, that is "metal-free phthalocyanine."

According to Cook, out of 38 metal-phthalocyanines tried besides FePc, all were inactive toward hydrogen peroxide except the phthalocyanines of chromium and cobalt, which were feebly active. None of Cook's reversible oxidation products have apparently been isolated in substance,

2 and Linstead indicated that his products underwent reduction, to regenerate a phthalocyanine color, when an attempt was made to crystallize them from organic solvents.

The idea occurred to me that if the oxidative treatment of phthalocyanines could be modified so as to be applicable to the more common commercial phthalocyanines in the first place, e. g., CuPc or NiPc (Pc standing for the word "phthalocyanine"); to produce readily isolable compounds in the second place, and to enable the entire process to be achieved with economical materials and by an economical procedure, new products of extreme industrial value might be thus produced.

For instance, the new products might be applicable to the dyeing or printing of textile material, by a process which would involve first impregnating the fiber with a solution of the intermediate, essentially colorless, products and then treatment of the fabric with reducing agents or heat to regenerate the color on the fiber. Such a dyeing process would resemble the process of dyeing with vat colors, except that whereas vat colors are reduced to make them soluble and are oxidized to regenerate the color, the reverse is true in the case of the phthalocyanines. Because of this analogy, furthermore, it will be convenient hereafter to refer to the intermediate, reversible oxidation derivatives of the phthalocyanine colors as leuco-phthalocyanine compounds, it being remembered, however, that the leuco-phthalocyanine is an oxidation product whereas the leuco-vat dyes are reduction products.

Now I have found that leuco-phthalocyanine compounds, of valuable, practical qualities, are obtained by treating copper phthalocyanine, and other valuable pigments of the phthalocyanine series with agents adapted to introduce into the molecule jointly a halogen atom and an organic ether radical. More particularly, the agents found practical in my invention are organic hypochlorites, that is compounds, of the formula R—O—Cl wherein R is an organic radical. However, inasmuch as most organic hypochlorites are explosive and therefore hazardous to handle, the preferred agents for my invention are branched-chain alkyl or aralkyl hypochlorites; for instance, t-butyl hypochlorite, t-amyl hypochlorite:

$C_2H_5.C(CH_3)_2OCl$ or the hypochlorites of phenyl- and p-tolyl-dimethyl carbinols:

$C_6H_5.C(CH_3)_2OCl$ and $CH_3.C_6H_4.C(CH_3)_2OCl$

The reaction is preferably carried out at room temperature in a non-aqueous medium having a solvent action for the hypochlorite chosen, as typified by ethyl alcohol, benzene, chloroform, etc. Cooling with ice may be applied, if desired, at the expense of speed of reaction, of course. On the other hand, warming, say up to 50° C., may be resorted to, provided the hypochlorite selected or its dilution in the solvent employed is such as to withstand safely such higher temperatures.

The reaction is believed to introduce a halogen atom into one or more of the outer N-atoms, and alkoxy or aralkoxy radicals into one adjacent C-atom for each of such halogenated outer N-atoms. The product, in the simplest case and taking copper phthalocyanine as a typical case, probably corresponds to the following formula:

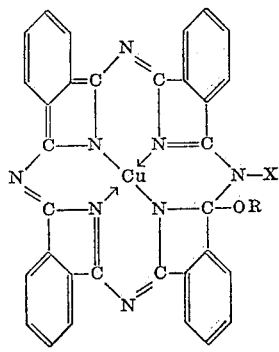

wherein X stands for Cl or Br, while R designates the t-butyl, 2-phenyl-isopropyl, 2-p-tolyl-isopropyl, or whatever other alkyl or aralkyl radical had been selected in the hypochlorite. In a more general way my novel series of compounds may be expressed by the formula:

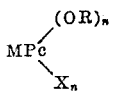

wherein X and OR have the same significance as above, MPc designates the molecule of a metal phthalocyanine (including dihydrogen phthalocyanine), while $n$ is a numeral not less than 1 and not greater than 4.

It is believed that the forces which normally give the phthalocyanine molecule a planar structure are disrupted by the entry of the two substituents indicated (X and OR), as a result of which the atoms undergo spatial reorientation, disrupting valence-bond resonance. This theory may account for the radically changed properties of the intermediate oxidation product and for its ready reversibility to the present material or (in some cases) to metal-free phthalocyanine.

The intermediate leuco products aforementioned are characterized first of all by loss of the characteristic blue or greenish-blue color of the parent material. The leuco compounds are relatively colorless compared to the parent materials, and they have no tinctorial or pigmentary powers whatever.

Also, whereas phthalocyanines in general are insoluble in most organic solvents, the novel leuco compounds are readily soluble in common organic solvents, such as ethylene-glycol-monoethyl ether, chloroform or acetone, producing generally brown solutions.

They are insoluble in water and, if synthesized in a water-miscible solvent, they may be precipitated out of their reaction mass by drowning the latter in water. They may also be isolated by crystallization or by evaporating the solvent. In solid form, they are sufficiently stable to permit their storage and shipment in commerce for practical, industrial uses.

When heated in dry state or in a suitable solvent they liberate halogen and regenerate the original phthalocyanine material, in the case of those phthalocyanines which are stable as to their metal content, for instance Cu, Cr, Ni, Co and Fe phthalocyanines. In the case of phthalocyanines, however, which readily lose their metal (as upon treatment with concentrated sulfuric acid), for instance in the case of magnesium or disodium phthalocyanine, the regenerated color is metal-free phthalocyanine. Apparently, the metal in these latter cases has become extracted during the hypochlorite treatment.

The temperature required for regeneration of the color by heating will vary with the nature of the metal in the complex compound, and with the degree of purity of the latter. In some cases it may be as high as 160° to 225° C. The regeneration of color may, however, be also achieved at lower temperatures by treating the leuco compounds with aqueous, alcoholic, or aqueous-alcoholic solutions of reducing agents. As instances of suitable reducing agents may be mentioned sodium sulfide, sodium or potassium sulfite, sodium or potassium bisulfite, sodium hydrosulfite, zinc formaldehyde sulfoxylate, stannous chloride, sulfur dioxide, hydriodic acid, ascorbic acid, hydrazine hydrate, and hydroxylamine.

Because of the above characteristic reversible properties, my novel compounds are useful in the dyeing or printing of textile fibers, as more fully discussed and illustrated in the examples hereinbelow.

Without limiting my invention, the following examples are given to illustrate my preferred mode of operation. Parts mentioned are by weight.

Example 1

A mixture of 50 parts of very finely divided copper phthalocyanine in alpha crystalline form, (produced by acid pasting) and 24 parts of t-butyl hypochlorite in 1,000 parts of methanol was agitated rapidly for seventy minutes at 25° C. Unchanged copper phthalocyanine was removed by filtration and the filtrate was allowed to stand for three days. There were obtained red-brown crystals which were separated, washed with methanol, and dried. Analysis gave the following results:

|  | Cu | N | Cl |
| --- | --- | --- | --- |
| Found | 9.48 | 16.20 | 5.23 |
| Calculated | 9.28 | 16.36 | 5.18 |

The calculations were based on the formula $$C_{32}H_{16}N_8Cu \cdot C_4H_9OCl$$

representing copper-phthalocyanine-t-butyl-hypochlorite addition product.

This product on reduction with excess ascorbic acid in boiling ethanol gave copper phthalocyanine (alpha form) in yield of 75%. It also yielded copper phthalocyanine when heated to about 225° C., the conversion being accompanied by the evolution of chlorine.

A similar run was made using finely divided copper phthalocyanine in beta form (prepared according to U. S. P. 2,556,730). A crystalline product was obtained which was identical with the product above with respect to X-ray diffraction, infrared, visible and ultra-violet spectra, and elementary analysis.

Example 2

To a mixture of 1350 parts of benzene and 150 parts of methanol were added 96 parts of finely divided beta copper phthalocyanine and 46 parts of t-butyl hypochlorite. The mixture was agitated for three hours at 26° C. and then filtered to remove unchanged copper phthalocyanine. The filtrate contained 73 parts of the leuco phthalocyanine compound in a soluble form. This material was recovered by filtration after drowning the solution in water and removing the benzene in vacuo. Upon reduction for fifteen minutes with 20 parts of sodium sulfide in 300 parts of boiling "Cellosolve" (glycol-monoethyl ether, B. P. 134°–135° C.), it gave copper phthalocyanine.

Example 3

Fourteen parts of finely divided nickel phthalocyanine and 5.5 parts of t-butyl hypochlorite were added to 300 parts of methanol. The mixture was agitated rapidly at 26° C. for seventy minutes, then warmed to 40° C. and filtered. The filtrate was evaporated in vacuo. 9 parts of a red-brown solid were obtained which gave nickel phthalocyanine upon reduction for fifteen minutes with ascorbic acid in boiling "Cellosolve."

Example 4

To 10 parts of finely divided β-copper phthalocyanine in 156 parts of benzene were added 8 parts of methyl alcohol and 9.6 parts of t-butyl hypochlorite. The mixture was agitated rapidly for three hours at 26° C., and then filtered. The filtrate was evaporated to dryness in vacuo at 30° C. There were obtained 9 parts of a reddish-brown solid which upon reduction by boiling in ethyl alcohol with 3 parts of ascorbic acid yielded copper phthalocyanine. A portion of this product was analyzed:

|            | Cu   | N     | Cl    |
|------------|------|-------|-------|
| Found      | 6.75 | 11.45 | 14.55 |
| Calculated | 6.29 | 11.08 | 14.04 |

The calculations in this case were based on the formula $C_{32}H_{16}N_8Cu \cdot 4C_4H_9OCl$.

Example 5

Five parts of monochloro copper phthalocyanine, very finely divided, and 250 parts of glycol monoethyl ether were mixed and cooled to between 5° C. and 10° C. A solution of 2.5 parts of t-butyl hypochlorite in 2.5 parts of t-butyl alcohol was then introduced over a period of thirty minutes. The reaction mass was aged in the dark for an additional thirty minutes and filtered. The filtrate, brownish-yellow in color, was drowned into 2000 parts of a dilute solution of sodium carbonate in water. The solid which precipitated was filtered off, washed with water and air dried without heating.

When 5 parts of the above product were reduced in 400 parts of glycol monoethyl ether with 5 parts of ascorbic acid at 30° C. for ten minutes, 2.89 parts of copper phthalocyanine were obtained.

The following additional example will illustrate the application of my novel compounds to the dyeing of textile fiber.

Example 6

1 part of the oxidation product of copper phthalocyanine produced in methanol with t-butyl hypochlorite according to Example 1 above is dissolved in 20 parts of glycol monoethyl ether and padded on cotton fabric which has first been swollen by boiling successively in water and in glycol monoethyl ether. The padding is dried and then boiled for 20 minutes in a 5% aqueous solution of potassium ferrocyanide. Development of color is completed by boiling the fabric, now green, in a 5% aqueous solution of lactic acid for 20 minutes. The fabric is then soaped for 20 minutes at 180° F. in an 0.5% soap solution, rinsed and dried. The dyeing exhibits the bright blue shade of copper phthalocyanine and is very fast to light and to wet treatments, including the application of bleaching agents such as sodium hypochlorite.

It will be understood that the details of the above examples may be varied within considerable limits, as indicated in the general discussion. Thus, in lieu of the particular solvents named in the examples, other convenient solvents may be employed, for instance methanol, ethanol, benzene, chloroform, the monoethyl ether of ethylene glycol, and the like.

The process may be applied to metal phthalocyanines other than CuPc, for instance those of Co, Ni, Cr, Fe, Mg and Na, as well as to metal-free phthalocyanine. When magnesium and disodium phthalocyanines are employed, the metal drops out during the oxidation step, and the intermediate leuco compound yields metal-free phthalocyanine upon regeneration.

Reduction to yield phthalocyanines may be accomplished with numerous reducing agents. At 100° C. or above, in aqueous ethyl-"Cellosolve" (monoethyl ether of ethylene glycol), few agents fail to reduce the phthalocyanine oxidation products. Most agents function at room temperature. The temperature and preferred time of reduction with a given agent will vary depending upon the metal M in the pigment. The oxidation products of cobalt phthalocyanine reduce more slowly than the oxidation products of copper phthalocyanine, for example.

For best results, good contact should be afforded between the reducing agent and the phthalocyanine oxidation product.

Another important factor is the degree of fineness and uniformity of the pigment particles used as starting material. Thus, although the crudes of many phthalocyanines having relatively coarse particles react poorly, the corresponding phthalocyanines that have been reduced to pigmentary state by treatments such as acid-pasting or salt-milling react much better.

I claim as my invention:

1. Compounds of the general formula

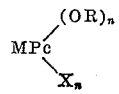

wherein MPc designates the molecule of a phthalocyanine compound of the group consisting of metal phthalocyanines and metal-free phthalocyanines, X is a halogen selected from the group consisting of chlorine and bromine, R is a hydrocarbon radical selected from the group consisting of t-butyl, t-amyl, 2-phenyl-isopropyl and 2-p-tolyl-isopropyl, while n is a subscript not less than 1 and not greater than 4, said compounds being characterized by greater solubility in ethylene-glycol-monoethyl ether than the corresponding phthalocyanine compounds of formula MPc and by generating a phthalocyanine pigment upon being treated with ascorbic acid.

2. Compounds of the general formula

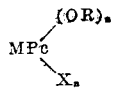

wherein MPc designates the molecule of a phthalocyanine compound of the group consisting of metal phthalocyanines and metal-free phthalocyanines, X is a halogen selected from the group consisting of chlorine and bromine, R is a hydrocarbon radical having a tertiary carbon atom and a total of not more than 10 C-atoms, and $n$ is a subscript not less than 1 and not greater than 4, said compounds being characterized by greater solubility in ethylene-glycol-monoethyl ether than the corresponding phthalocyanine compound of formula MPc and by generating a phthalocyanine pigment upon being treated with ascorbic acid.

3. A compound of the formula

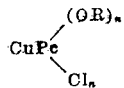

wherein CuPc represents copper phthalocyanine while R represents a hydrocarbon radical having a tertiary carbon atom and a total of not more than 10 C-atoms, and $n$ is a subscript not less than 1 and not greater than 4.

4. The reversible, solvent-soluble addition product of copper phthalocyanine and tertiary butyl hypochlorite.

5. The reversible, solvent soluble addition product of metal-free phthalocyanine and tertiary butyl hypochlorite.

6. The process of producing a reversible, leuco derivative of a phthalocyanine coloring matter, which comprises reacting the latter, in an inert organic liquid medium, with an organic hypochlorite of the formula R—O—Cl, wherein R is a hydrocarbon radical selected from the group consisting of t-butyl, t-amyl, 2-phenyl-isopropyl and 2-p-tolyl-isopropyl.

7. The process of producing a reversible, leuco derivative of a phthalocyanine coloring matter, which comprises reacting the latter, in an inert liquid medium, with tertiary butyl hypochlorite.

8. The process of producing an intermediate, leuco derivative of copper phthalocyanine, capable of generating copper phthalocyanine upon treatment with reducing agents, which comprises reacting upon copper phthalocyanine with a solution of tertiary butyl hypochlorite in a water-miscible organic solvent, and recovering the leuco compound from the reaction mass by drowning the latter in water.

9. The process of producing phthalocyanine coloring matters, which comprises subjecting compounds as defined in claim 2 to the action of a reducing agent selected from the group consisting of the alkali-metal sulfides, sulfites, bisulfites and hydrosulfites, zinc formaldehyde sulfoxylate, stannous chloride, sulfur dioxide, hydriodic acid, ascorbic acid, hydrazine hydrate and hydroxylamine.

CHARLES JOHN PEDERSEN.

References Cited in the file of this patent

Adams et al.—Organic Reactions—vol. 6, p. 482 (1951).